Figure 1:
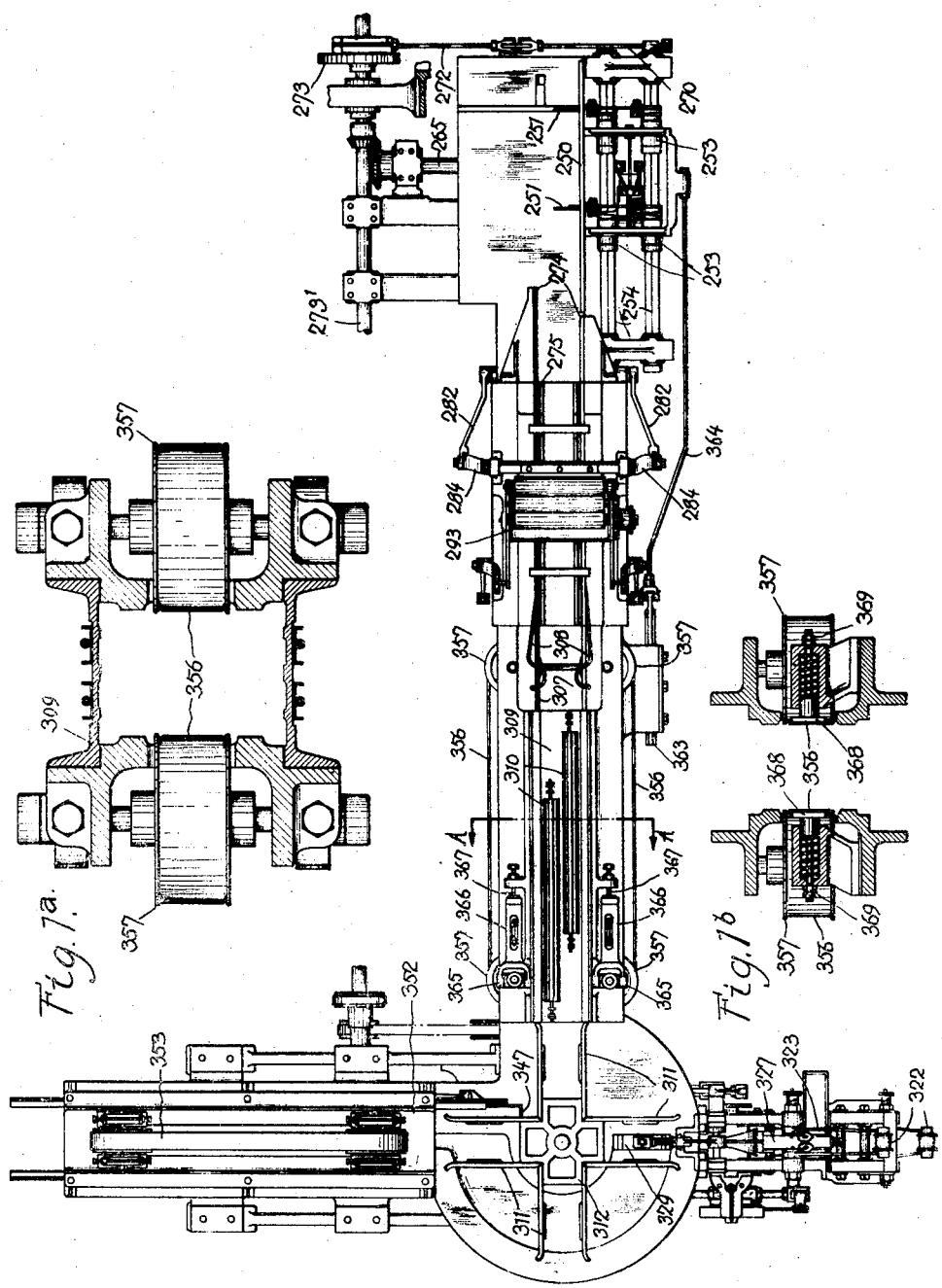

May 3, 1927.

E. P. WEBSTER 1,627,363

SEALING MACHINE FOR CARTONS

Filed June 9, 1924    12 Sheets-Sheet 6

INVENTOR
E. P. Webster
BY
E. W. Anderson
ATTORNEY

May 3, 1927.
E. P. WEBSTER
1,627,363
SEALING MACHINE FOR CARTONS
Filed June 9, 1924
12 Sheets-Sheet 7
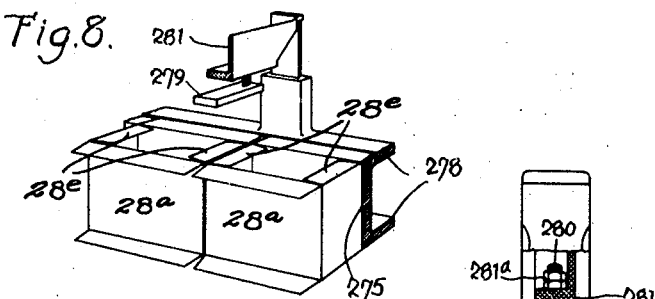
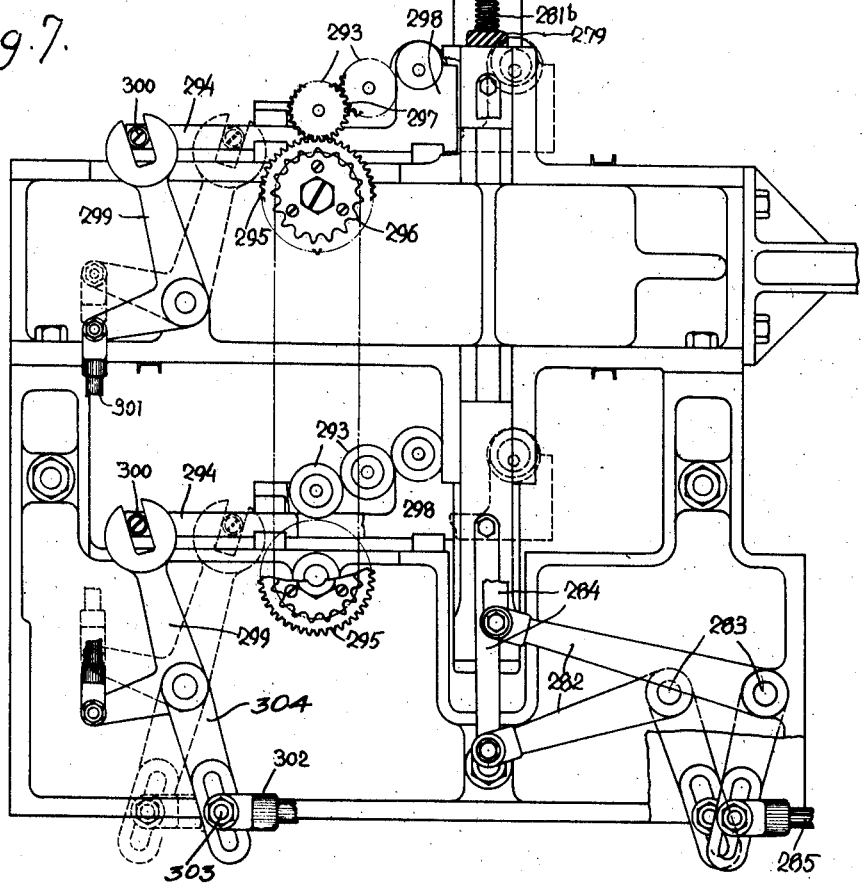
INVENTOR
E. P. Webster
BY
E. W. Anderson
ATTORNEY

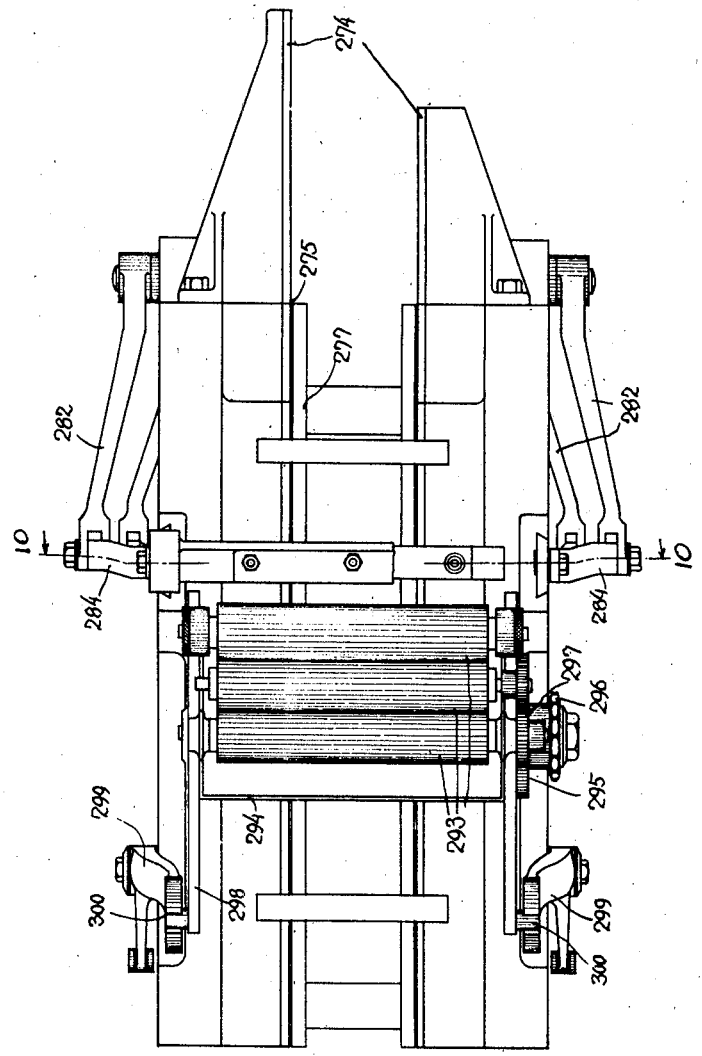

May 3, 1927.

E. P. WEBSTER 1,627,363

SEALING MACHINE FOR CARTONS

Filed June 9, 1924      12 Sheets-Sheet 9

INVENTOR
E. P. Webster.
BY
E. W. Anderson
ATTORNEY

May 3, 1927.

E. P. WEBSTER 1,627,363

SEALING MACHINE FOR CARTONS

Filed June 9, 1924

12 Sheets-Sheet 11

INVENTOR
E. P. Webster
BY
E. W. Anderson
ATTORNEY

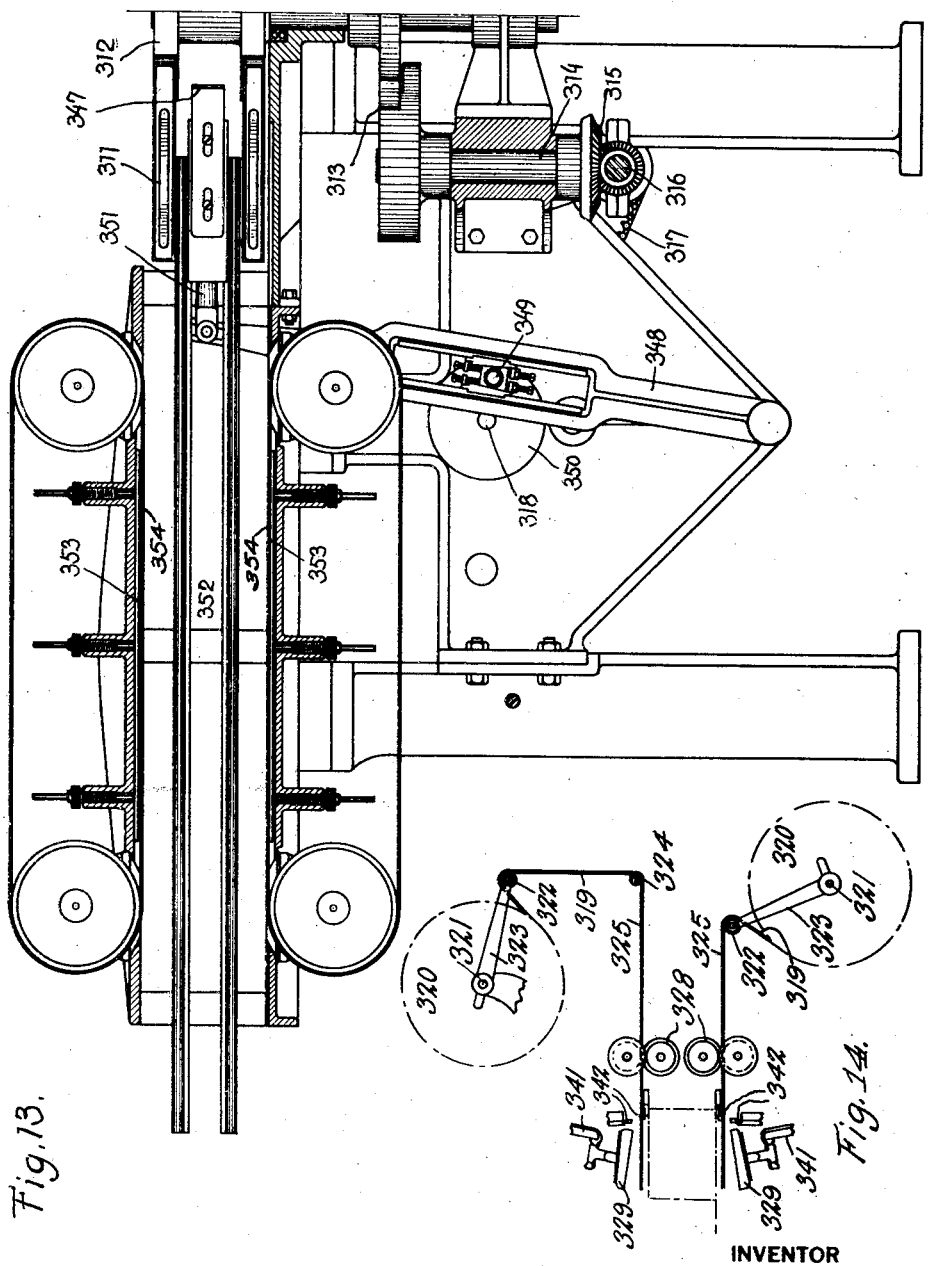

Patented May 3, 1927.

1,627,363

UNITED STATES PATENT OFFICE.

EARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

SEALING MACHINE FOR CARTONS.

Application filed June 9, 1924. Serial No. 718,840.

This invention relates to machines for sealing cartons and has to do more particularly with a machine constructed and arranged to act on cartons having flaps at the top and bottom which are turned inwardly to close the carton. The present machine is arranged to receive these cartons, effect the permanent closure of the cartons by applying adhesive to the flaps, and affix sealing strips over the outer flaps to complete the sealing operation. The machine of the present invention is particularly useful in conjunction with the carton-packing machine illustrated in my application for patent Ser. No. 593,335, filed October 9, 1922, and for purposes of illustration an embodiment of the invention arranged to receive cartons from the packing machine there illustrated and to seal these cartons will be described. It is to be understood, however, that the cartons to be sealed may be fed to the sealing device manually or by any desired automatic mechanism suitable for the purpose.

The machine receives cartons having top and bottom openings and also having side and end flaps at top and bottom. The cartons fed to the machine have the end flaps at both top and bottom turned inwardly, while the side flaps in each case are folded against the outer walls of the carton. The cartons advance through the machine in single file and at one point in the movement folding devices operate to move the flaps folded against the side walls from a vertical to a horizontal position. Adhesive is now applied to suitable points on the flaps and thereafter the side flaps are bent inwardly to overlie the end flaps at both top and bottom, the adhesive serving to cause the flaps to stick together. The cartons now pass through a heating chamber, wherein the heat causes the adhesive to set. From this heating chamber the cartons pass to devices by which a sealing strip is applied at both top and bottom to cover the joints between the outermost flaps. After this operation is completed, the cartons are discharged from the machine and are ready for shipment.

For a better understanding of the invention, reference may be had to the accompanying drawings, in which—

Figure 2:
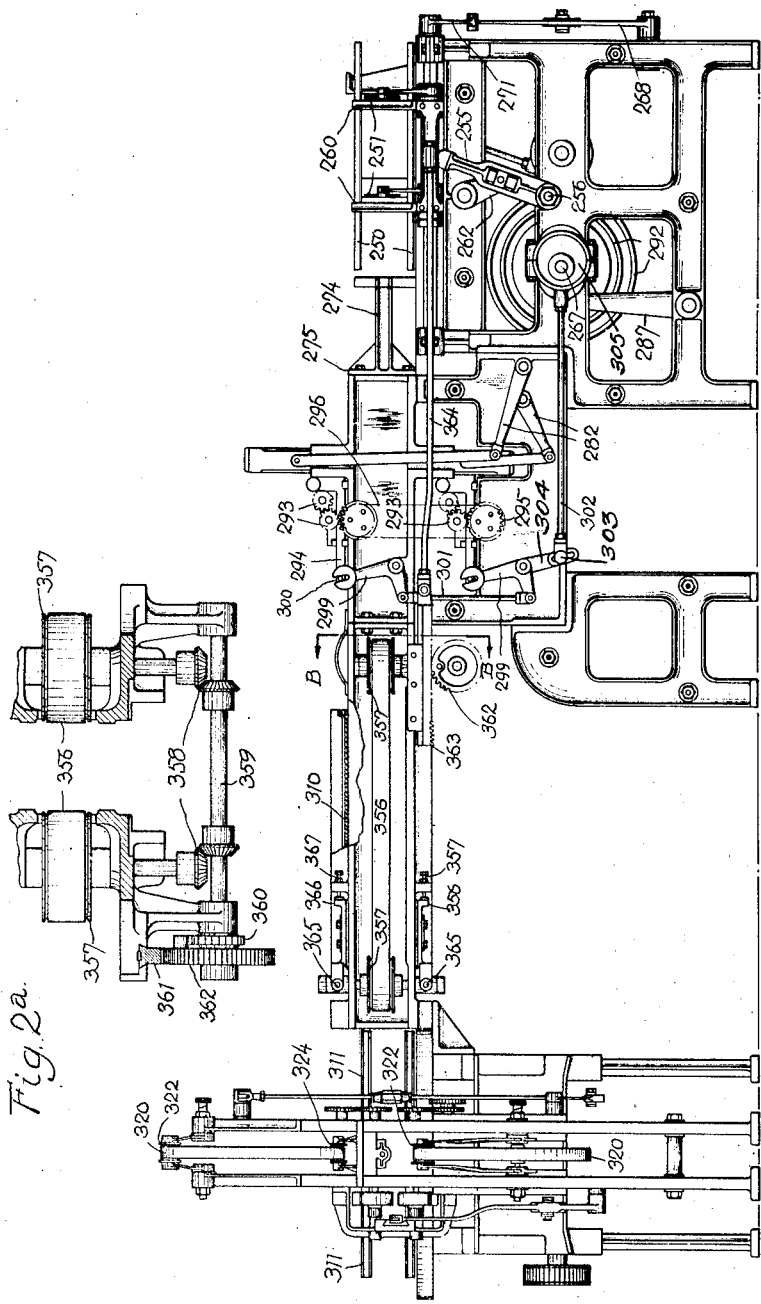
Figure 3:
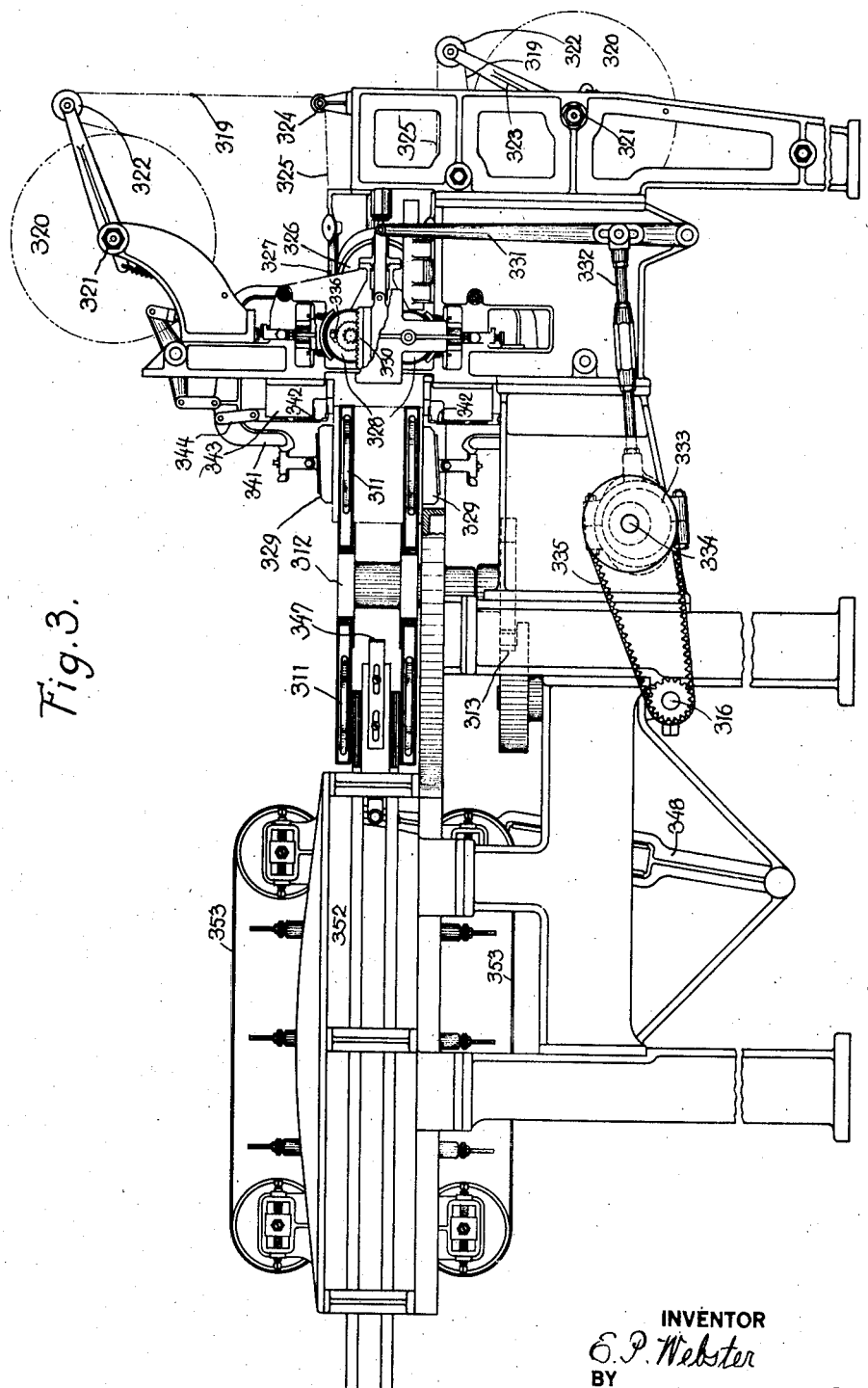
Figure 4:
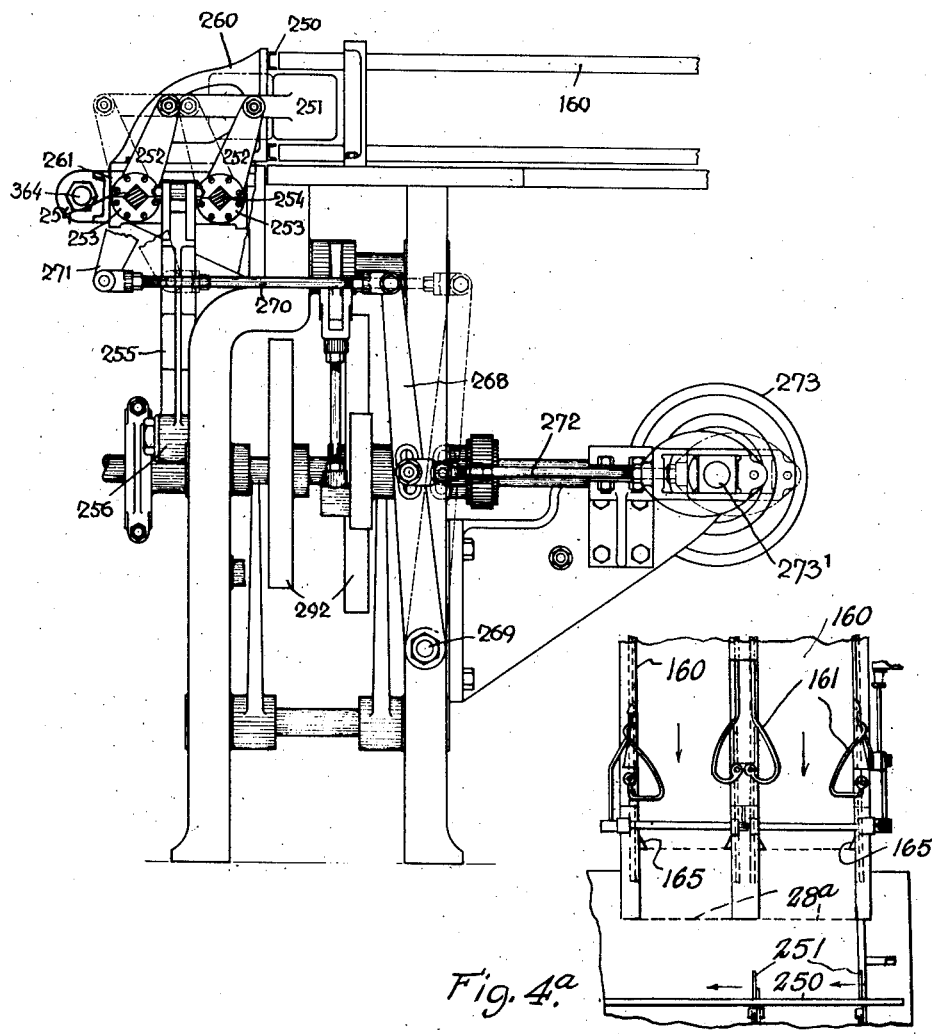
Figure 5:
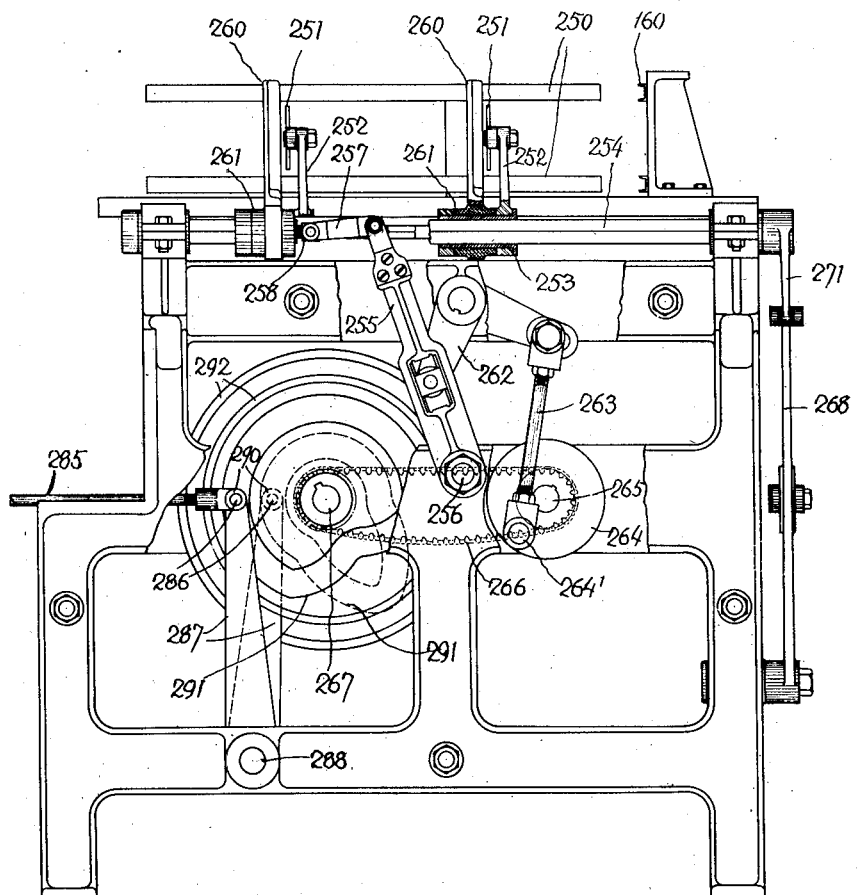
Figure 6:
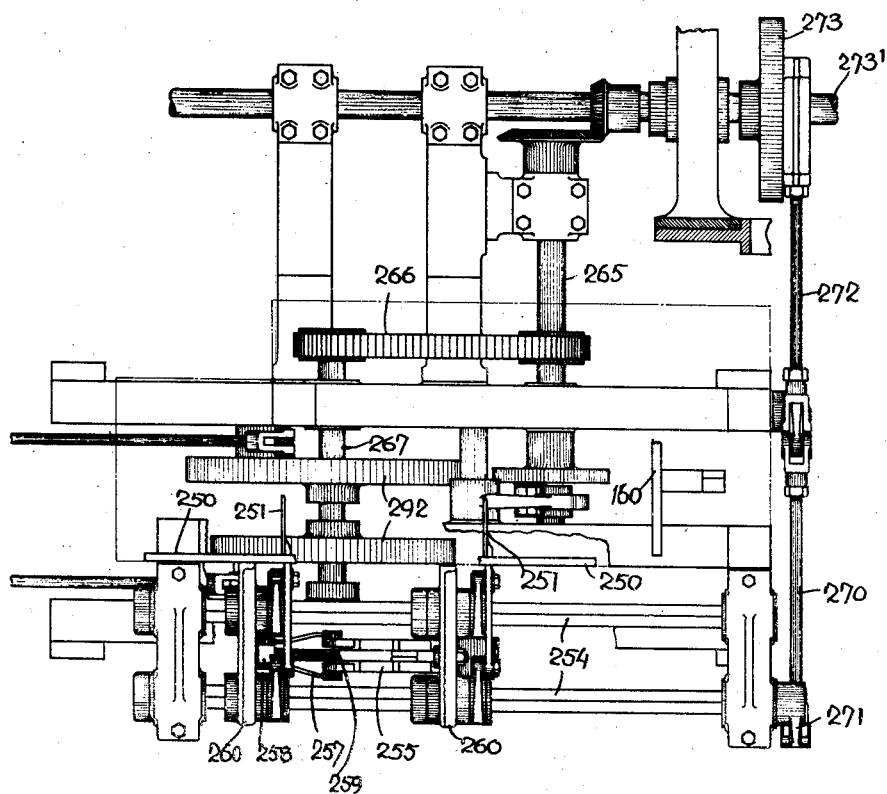
Figure 10:
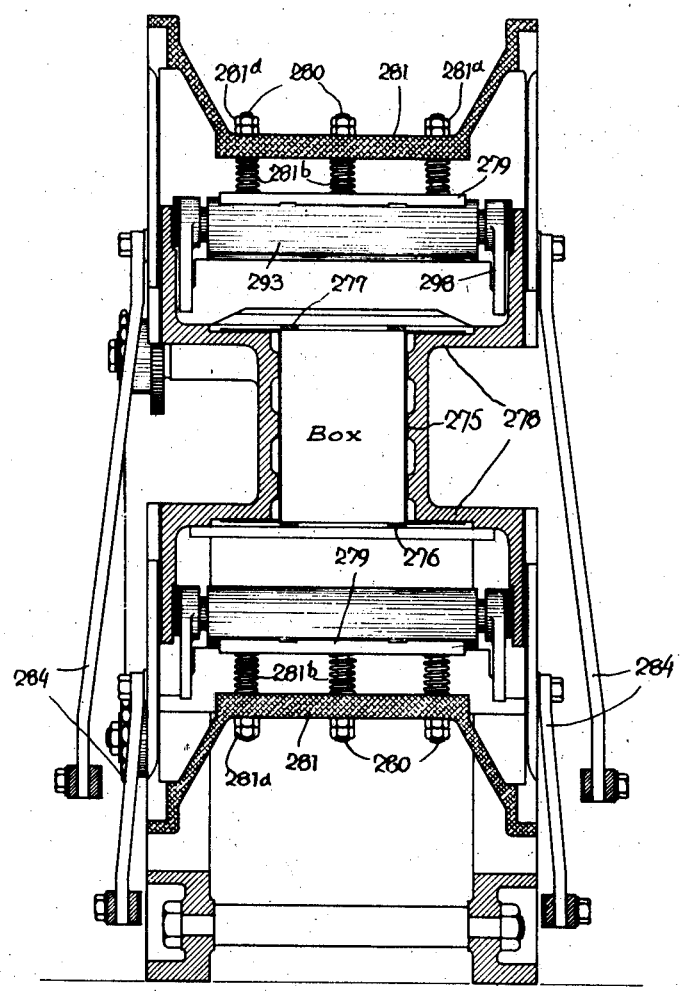
Figure 11:
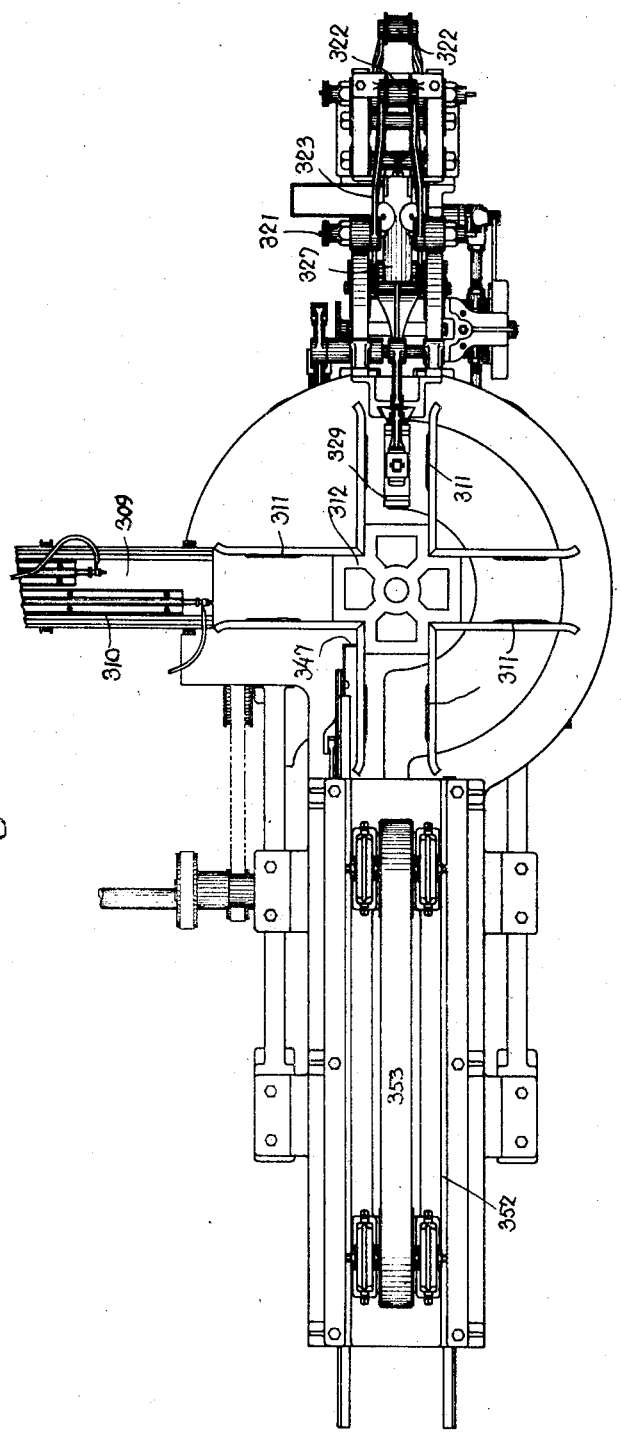
Figures 12, 15:
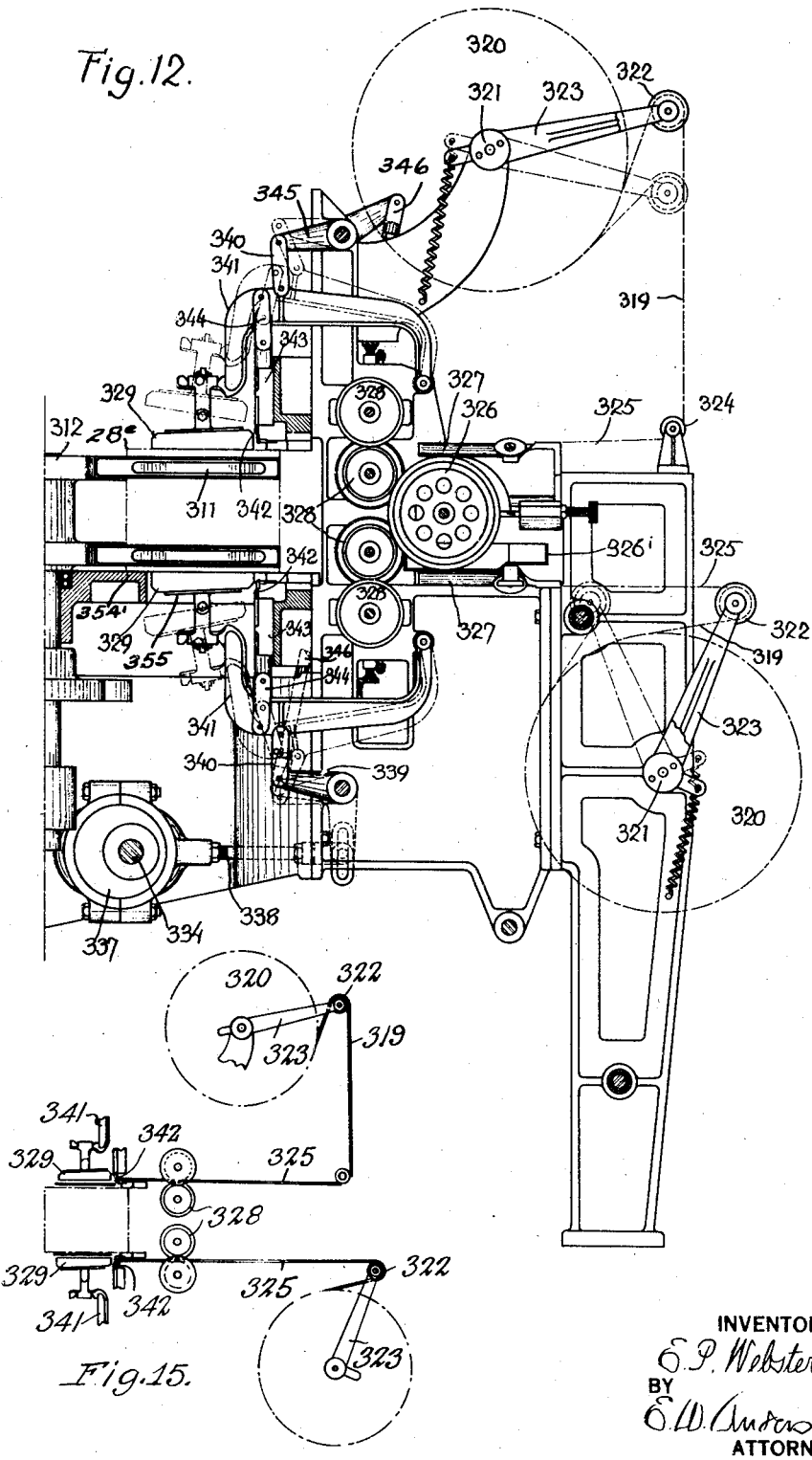

Figure 1 is a plan view of the machine.
Figure 1ª is a section on the line A—A, Figure 1, with the belt pressure devices removed.
Figure 1ᵇ is a section upon a similar line with parts removed and showing the belt pressure devices.
Figure 2 is a side view of the machine.
Figure 2ª is a section upon the line B—B, Figure 2, with parts broken away.
Figure 3 is an end view of the machine.
Figure 4 is a view from the opposite end.
Figure 4ª is a fragmentary plan view showing a portion of the guideways along which the cartons are advanced toward the sealing mechanism.
Figure 5 is an enlarged side view of a portion of the machine.
Figure 6 is an enlarged plan view of the same portion.
Figure 7 is an enlarged side view of another portion of the machine.
Figure 8 is a fragmentary perspective view showing two cartons in position adjacent the gluing means for side flaps and end flaps.
Figure 9 is a plan view of that portion of the machine shown in Figure 7.
Figure 10 is a vertical section on the line 10—10, Figure 9.
Figure 11 is an enlarged plan view of that end portion of the machine for applying the sealing strips to the tops and bottoms of the cartons.
Figure 12 is a side view of the same, in part, with parts removed and parts in section.
Figure 13 is a companion view to Figure 12, showing the remainder of said end portion of the machine.
Figures 14 and 15 are diagrammatic side views of the means for applying the sealing strips to the tops and bottoms of the cartons, Figure 14 showing the sealing strips in position adjacent the cartons, the latter being shown in dotted lines and Figure 15 showing the presser feet and cutters in second position with the sealing strips applied and cut.

Referring now to the drawings, the machine is shown as disposed at the end of parallel guide-ways 160 (Fig. 4ª) along which the cartons are advanced from the packing machine. The cartons are discharged from the latter in pairs and are advanced two abreast by means of reciprocatory members 165. In their movement along the guide-ways, the cartons pass folding devices 161 which move the top end flaps 28ᵉ of the cartons to closed position in which they overlie the cartons. At the end of the guide-ways the two most advanced cartons 28ᵃ reach a position in contact with upper and lower horizontal stop rails 250 and reciprocating pusher members 251 which operate in a horizontal direction at right angles to the direction in which the cartons have been moving along guide-ways 160, engage each of the cartons in a pair lying abreast and advance these cartons horizontally to the sealing devices. The details of the mechanism by which the cartons are advanced two abreast through guideways 160 to a position in which they are engaged by the pusher members 251, are set forth in my Patent No. 1,592,794, issued July 13, 1926.

The pusher members 251 (Fig. 4) are carried by parallel movement rocker arms 252, the latter fast at their lower ends to sleeves 253, four in number, and having each a squared aperture engaging slidably two squared rock shafts 254, said members being given a rectangular path of movement, inwardly to operative position, longitudinally to push the cartons along as stated in single file, outward to permit farther advance of said cartons upon the next operative movement of said members, and longitudinally back to first position.

The longitudinal forward and back movement of the pusher members is accomplished by rock lever 255 (Fig. 5), fulcrumed at its lower end at 256 and at its upper end having pivotal link connection 257 with a nut 258 threaded upon a rod 259 connecting two heads 260. The latter carry the aforesaid stop rails 250 and have lower extensions 261 which engage the sleeves 253 and provide a means of mounting the heads upon these sleeves. The lever 255 is rocked by bell lever 262 having link connection 263 with eccentric pin 264' of wheel 264, the shaft 265 of the latter having chain drive connection 266 with a shaft 267.

The inward and outward movement of the pusher members is accomplished by moving the rocker arms 252 in parallel pivotally through lever 268, fulcrumed at its lower end at 269 and having a link connection 270 with an arm 271 of the outer of the two squared shafts 254, said lever being operated by a link 272, the outer end of which engages eccentric 273 upon shaft 273'. The cartons advanced have their top and bottom end flaps turned inwardly over the ends of the cartons, while their top and bottom side flaps are folded down against the sides of the cartons. In the movement of the cartons, the side flaps are engaged by cam strips 274 and thereby moved through an arc of ninety degrees from vertical to horizontal position. The cartons then pass into a guideway 275 and between upper and lower skeleton horizontal supporting and overlying strips 276 and 277 (Fig. 10), the upper and lower side flaps of the cartons being in contact with and sliding along the upper and lower horizontal surfaces 278 of the top and bottom extensions of said guideway. The parts are adapted for the approach from above and below, of the gluing means for said side flaps and end flaps.

The means for applying adhesive or glue to the flaps includes upper and lower horizontal pads 279 extending transversely of the cartons. These pads are carried by rods 280 passing loosely through perforations in the upper and lower supporting frames 281. Pressure springs 281ᵇ surround the rods and the rods carry adjustment nuts 281ᵃ on their ends. The pads are of a length sufficient to extend across the cartons and overlie the side flaps which are supported horizontally on the surfaces 278. The cartons are advanced (Fig. 8) in single file, with the ends of adjacent cartons in contact, and with a step by step movement. At each period of rest in this movement, two cartons are positioned with their adjacent ends lying beneath the pads 279, and on the movement of the latter toward the cartons, adhesive is applied to the upper surface of an end flap of each carton and a portion of the surface of the side flaps which are to be folded into contact with the end flaps. The movement of the pads 279 is accomplished by means of rock levers 282 (Fig. 7) fulcrumed at 283 and having link connections 284 with the frames 281. These levers are operated by rods 285 connected at one end at 286 (Fig. 5) to rock levers 287 loose upon shaft 288 and carrying rollers 290 which travel in cam tracks 291 in discs 292 fast upon a rotating shaft 267.

The gluing pads 279 (Fig. 7) are supplied with glue by means of a train of rollers 293 for each pad, the lowermost roller of each train working in a glue pan 294, and all three rollers of each train having circumferential engagement whereby when the lowermost roller is rotated in its glue pan, the glue is distributed from the same to the middle and thereby to the upper roller.

The lower roller of each train is rotated by gears 295, engaging the gear 297 thereof and having sprocket gear driving connection 296, and the lower and middle rollers of each train have spur gear connection 297, said lower and middle rollers having journal bearings in the framing, whereas the upper roller of each train has journal bearings in a slide frame 298. The upper and lower slide frames are reciprocated to cause the upper roller of the trains to wipe across the upper and lower glue pads aforesaid, this movement of reciprocation being accomplished by means of rock levers 299, having slot and pin connection 300 with the slide frames and connected together by a link connection 301, the lower of said rock levers being operated by rod 302, having slot and pin connection 303 with an arm 304 of the shaft of said lower rock lever, said rod 302 having an eccentric operating connection 305 with the aforesaid shaft 267.

The cartons are fed through the guideway 275 in single file by the pusher members 251, and are fed from said guideway by the same members through guideway 307, open at top and bottom and provided with upper and lower cam folding members 308, whereby the upper and lower side flaps of the cartons are folded over from open horizontal position to closed horizontal position, in contact at the ends thereof with the horizontally positioned closed end flaps, the cartons being upheld by suitable means as they pass through the last named guideway.

The cartons are now fed from the guideway 307 by the same pusher members 251 to the hot box 309, having electric heaters 310, the adhesive material being dried and set within the hot box.

The cartons are fed through the hot box 309 by means of opposite endless belts 356 (Fig. 2ᵃ), carried by pulleys 357, and driven by the forward of said pulleys, as will be explained. For this purpose, the forward pulleys 357 are rotated intermittently by gearing 358, the shaft 359 of which carries a ratchet wheel 360, intermittently operated by pawl 361, carried by spur gear 362, loose upon shaft 359, said spur gear being rotated forwardly and back by means of a rack 363 located at one end of connecting rod 364, the other end of which is attached to the same frame as that upon which the pusher members 251 are pivoted. In this way the pulleys 357 are intermittently rotated, and each stroke of the pusher members 251, which is equivalent to the length of a carton, causes the pulleys to advance the cartons at the same speed as that by which they are fed by the pusher members. The cartons are thus positively advanced so that there is no pressure exerted on the cartons, due to the rear cartons in the series having to move those ahead of them.

In order to adjust the tension of the endless belts 356, the rear pulleys 357 have the vertical shafts thereof horizontally pivoted at 365 to brackets 366, set screws 367 having threaded engagement with the framing and with said brackets, and any inequality of the adjustment of the upper and lower set screws being taken care of by the universal bearing for the said rear pulleys.

The endless belts 356 are held up to their work in feeding the cartons through the hot box by spring pressed plates 368 (Fig. 1ᵇ), the amount of the pressure being governed by the adjustment of the nuts 369 upon the threaded stems of said plates.

In this way the cartons are delivered intermittently one at a time to the spring jaws 311 of the turntable 312. The turntable 312 is intermittently rotated through an arc of ninety degrees for each intermittent movement by Geneva gearing 313 (Fig. 13), one member of which is carried by shaft 314, the latter having bevel gearing connection 315 with a shaft 316, the latter having chain drive connection 317 with a shaft 318.

The cartons carried by the turntable are sealed at top and bottom by sealing strips 319 (Figs. 14, 15), forming part of rolls 320, journaled in the framing at 321, the sealing strips passing from said rolls around guide pulleys 322, carried at the ends of spring tensioned arms 323, the upper strip passing around stationary guide pulley 324, before being fed to the carton.

The sealing strips are fed from their guide pulleys horizontally at 325 (Fig. 12) in vertically spaced relation to upper and lower transversely arched forming members 327, adapted to give to the sealing strips a transversely arched form to stiffen the same as they are fed along to prevent sagging, said strips next passing between upper and lower pairs of rollers 328, the peripheries of the inner of which are in contact with a roller 326 working in a glue pan 326′ whereby the glue from said pan is distributed to the inner faces of the sealing strips, the peripheries of the rollers 328 being also of transversely arched form.

From the gluing rollers 328, the sealing strips pass to the cartons above and below the same and between the same and upper and lower presser feet 329, said cartons being as stated located in the spring gripping jaws of the turntable.

The feeding of the upper and lower sealing strips is accomplished by rack and pinion gear 330 (Fig. 3), of which the rack is operated by lever 331, having a link connection 332 with eccentric 333 upon shaft 334. The shaft 334 has a chain drive connection 335 with the shaft 316 and the pinions of the rack and pinion mechanism have a ratchet and pawl connection 336 with the shafts of the inner of the rollers 328, whereby these pinions are positively rotated upon the operative stroke of the rack of said gear and idly rotated upon the reverse stroke thereof.

The presser feet 329 (Fig. 12) are operated respectively in opposite directions to press the sealing strips upon the tops and bottoms of the cartons at the middle longitudinal joint between the upper and lower pairs of side flaps by an eccentric 337, having link connection 338 with a bell lever 339 the latter having link connection 340, with rocker arms 341 carrying said presser feet, said eccentric being carried by the shaft 334, aforesaid, and the result being that the opposite movements of the presser feet will carry the sealing strips therewith and press the same upon the cartons as stated.

During the movement of the presser feet, the sealing strips are cut from the ends of the main strips fed from said rolls by knives 342, of which one is stationary and the other slides in bearings 343 and has pivotal link connection 344 with its rocker arm 341. In the case of the upper rocker arm there is a rocker lever 345 and a link 346 in addition to link 340, in order that said upper rocker arm shall move downwardly at the same time that the lower rocker arm moves upwardly.

The sealed cartons are automatically ejected from the spring jaws of the turntable by finger 347 (Fig. 13), reciprocated by a lever 348, having an eccentric pin actuating connection 349 with a disk 350, fast upon shaft 318, said pin working in a slot of said lever. The finger 347 has an adjustable slot and pin connection with a carrying rod 351 thereof, said rod sliding in suitable guides.

The turntable 312 has four radial spring jaws 311 for the cartons, and a carton is delivered from the hot box 309 to the jaws of one of these arms 311 intermittently. The turnable rotates through an arc of 90° during the stoppages in the intermittent movement of the pusher members 251 and in each position of rest a carton is brought in operative relation to the means for applying the sealing strips. When the sealing strips have been placed on the carton during the period of rest of the turn table, the latter is then advanced through another arc of 90°, no operation being performed on the carton during this movement. On the next movement of 90° of the turn table, a carton is brought to a position in front of the ejecting finger 347 and the latter then operates to eject the cartons intermittently.

The cartons are moved by the ejecting finger 347 into a guideway 352, the upper and lower walls of which are formed by endless belts 353, acting to press the sealing strips just applied to the cartons, to position thereon so that the said strips will be properly flattened upon the cartons and time shall be given the glue of the strips to dry sufficiently before ejection of the cartons from the machine.

The endless belts 353 (Fig. 13) have the inner stretches thereof applied more closely to the upper and lower sealing strips of the cartons by spring presser members 354, working between said inner stretches and the upper and lower rigid walls of the guideway 352.

In order that the cartons with the sealing strips in place may be carried about the turn table without damage to the bottom sealing strips, the turn table has its lower wall 354', on which the cartons rest, cut away at 355. The cartons are moved so that the bottom sealing strips are disposed in this cut-away portion, and this necessitates that the sealing strips shall be slightly shorter than the cartons to permit the ends of the cartons not covered by the strips to be supported on the table 354' at either edge of the opening. Accordingly, the mechanism by which the sealing strips are fed is arranged to feed the strips intermittently in proper lengths, which are slightly shorter than the cartons to which they are to be applied. The cartons, however, are tightly sealed, regardless of this fact, since the side and end flaps are sealed together by the adhesive which is applied at points immediately adjacent the ends of the sealing strips.

I claim:—

1. In a carton sealing machine, the combination of means for advancing a succession of cartons arranged in pairs abreast, along a guide-way, means for advancing the cartons of each pair in single file along a guide-way at an angle to the first, and means in the path of travel of the cartons moving in single file for sealing the cartons.

2. In a carton sealing machine, the combination of means for advancing a succession of cartons, arranged in pairs abreast, along a guide-way, means operating intermittently for advancing the cartons of each pair in single file along a guide-way at an angle to the first, and means in the path of travel of the cartons moving in single file for sealing the cartons.

3. In a carton sealing machine, the combination of a guide-way, means for advancing cartons having flaps along the guide-way in single file, means for closing the flaps, means for receiving the cartons successively and carrying them through a curved path in a succession of steps, and means operating in the periods of rest of the movement of the cartons through the said curved path for applying sealing strips to the cartons to secure the flaps thereof.

4. In a carton sealing machine, the combination of a guide-way, means for advancing cartons having flaps along the guideway in single file, means for closing the flaps, means for receiving the cartons successively and carrying them through a curved path, and means for applying sealing strips to the cartons to secure the flaps while the cartons are moving through the said curved path.

5. In a carton sealing machine, means including a guideway for feeding a succession of cartons with their end flaps in horizontal closed position and their side flaps in horizontal open position, means for intermittently applying transverse horizontally spaced lines of adhesive to the end flaps and side flaps of adjacent cartons, said guideway being adapted to support the cartons and maintain said flaps in the positions stated and having openings for admission of the adhesive applying means, means for closing said side flaps upon said end flaps, and a hot box adapted to maintain the contact of side flaps and end flaps and having means for feeding the cartons therethrough.

6. In a carton sealing machine, means for intermittently feeding a succession of cartons one carton length upon each movement with the carton end flaps in horizontal closed position and side flaps in horizontal open position, means for intermittently applying transverse horizontally spaced lines of adhesive to the end flaps and side flaps of adjacent cartons, means for moving the side flaps to closed position upon the end flaps, and means for applying sealing strips longitudinally of the cartons along the joints of said side flaps.

7. In a carton sealing machine, means for intermittently feeding a succession of cartons one carton length upon each movement with the carton end flaps in horizontal closed position and side flaps in horizontal open position, means for intermittently applying transverse horizontally spaced lines of adhesive to the end flaps and side flaps of adjacent cartons, means for moving the side flaps to closed position upon the end flaps, a turntable having radial carton gripping jaws, means for intermittently applying sealing strips longitudinally of the cartons along the joints of said side flaps, means for ejecting the cartons from the turntable, and means for intermittently rotating the turntable to bring the radial jaws thereof successively opposite the carton feeding means, the sealing strip applying means and the carton ejecting means.

8. In a carton sealing machine, means for intermittently feeding a succession of cartons one carton length upon each movement with the carton end flaps in horizontal closed position and side flaps in horizontal open position, means for intermittently applying transverse horizontally spaced lines of adhesive to the end flaps and side flaps of adjacent cartons, means for moving the side flaps to closed position upon the end flaps, a turntable having radial carton gripping jaws, means for intermittently applying sealing strips longitudinally of the cartons along the joints of the side flaps including means for feeding the sealing strips above and below the cartons and reciprocatory means for severing the sealing strip in separate lengths and thereafter pressing said lengths upon the tops and bottoms of the cartons, means for ejecting the cartons from the turntable, and means for intermittently rotating the turntable to bring the radial jaws thereof successively opposite the carton feeding means, the sealing strip applying means and the carton ejecting means.

9. In a carton sealing machine, means for feeding a succession of cartons two abreast, means for feeding a succession of the two end members so fed abreast in single file, means for moving the end flaps of the cartons to horizontal closed position, means for moving the side flaps to horizontal open position, means for applying glue transversely of the said end flaps and of the ends of the side flaps, means for moving the side flaps to horizontal closed position, and means for applying sealing strips longitudinally of the cartons along the joint of said side flaps.

10. In a carton sealing machine, means for feeding a succession of cartons two abreast, means for feeding a succession of the two end members so fed abreast in single file, means for moving the end flaps of the cartons to horizontal closed position and the side flaps to horizontal open position, means for applying glue transversely of said end flaps and of the ends of the side flaps, means for moving the side flaps to horizontal closed position, means for applying sealing strips longitudinally of the cartons along the joint of said side flaps, and means for ejecting the cartons from the machine.

11. In a carton sealing machine, means for feeding a succession of cartons two abreast, means for feeding a succession of the two end members so fed abreast in single file, means for moving the end flaps of the cartons to horizontal closed position and the side flaps to horizontal open position, means for applying glue upon said end flaps and upon the ends of the side flaps, means for moving the side flaps upon the end flaps, means for applying sealing strips along the joints of said side flaps, including a turntable wherein the cartons are received and carried to the sealing strip applying means, and means for ejecting the cartons from the machine and whereto the cartons are carried by said turntable.

12. In a carton sealing machine, the combination of a guide-way for cartons having closing flaps, means for advancing a succession of cartons along the guide-way, means for applying adhesive to the flaps of the cartons advancing along the guide-way and folding the flaps to close the cartons, a heating chamber through which the cartons are moved after being closed by the closing means, and means for applying sealing strips to the cartons over the flaps.

13. In a carton sealing machine, the combination of a guide-way for cartons having closing flaps, means for advancing a succession of cartons along the guide-way, means for applying adhesive to the flaps of the cartons advancing along the guide-way and folding the flaps to close the cartons, a heating chamber through which the cartons are moved after being closed by the closing means, an intermittently moving receiver operable to receive the cartons in spaced position thereon, and means for applying sealing strips over the flaps of the cartons on the receiver.

14. In a carton sealing machine, the combination of a guide-way for cartons having closing flaps, means for advancing a succession of cartons along the guide-way, an intermittently moving receiver at the end of the guide-way arranged to receive cartons in separated relation, and means for applying sealing strips over the flaps of the cartons on the receiver.

15. In a carton sealing machine, the combination of a guide-way for cartons having closing flaps, means for advancing a succession of cartons along the guide-way, a movable receiver at the end of the guide-way arranged to receive the cartons in separated relation, and means past which the cartons are moved one after another by the receiver for applying sealing strips over the flaps of the cartons.

16. In a carton sealing machine, the combination of a guide-way for cartons having closing flaps, means for advancing a succession of cartons along the guide-way, a rotary receiver having a step by step movement of rotation and arranged to receive the cartons from the guide-way in separated relation, and means for applying sealing strips over the flaps of the cartons on the receiver, this means being intermittent in action and arranged to operate on cartons brought successively to rest by the receiver in a position to be acted upon.

17. In a carton sealing machine, the combination of a guide-way for cartons having closing flaps, means for advancing a continuous succession of cartons along the guide-way, means for applying adhesive to the flaps of the cartons advancing along the guide-way and folding the flaps to close the cartons, means for receiving the succession of cartons and advancing them in separated relation, and means for applying sealing strips over the flaps of the cartons thus being advanced.

18. In a carton sealing machine the combination of means for advancing a succession of cartons having closing flaps with a step by step movement, and means operating intermittently and in the periods of rest of the step by step movement for applying sealing strips to the flaps of the cartons.

19. In a carton sealing machine the combination of means for advancing a succession of cartons having closing flaps with a step by step movement, means operating intermittently for feeding a sealing strip, and means operating in the periods of rest of the step by step movement of the cartons for severing and applying a length of this strip to each carton over the flaps thereof.

20. In a carton sealing machine the combination of means for advancing a succession of cartons having closing flaps with a step by step movement, intermittently operating means for feeding a sealing strip, and reciprocatory means operating in the periods of rest of the step by step movement for severing a length of the strip and applying it to each carton over the flaps thereof.

21. In a carton sealing machine, the combination of a guideway for cartons, means for advancing a succession of cartons having inner and outer flaps along the guideway, the outer flaps of the cartons being held down against the side walls of the cartons during such movement, means engaging the outer flaps of the cartons and raising them as the cartons are advanced, means for applying adhesive to the flaps while in such raised position, and means operating on the flaps after they have received adhesive to fold the flaps inwardly over the inner flaps.

22. In a carton sealing machine, the combination of means for advancing a succession of cartons having flaps for closing their top and bottom ends, means for applying adhesive to the flaps, means for folding the flaps to closed position after adhesive has been applied to them, heating surfaces between which the cartons with their flaps folded are passed, these surfaces serving to dry the adhesive, and moving means engaging the opposite side walls of the cartons for moving them past the heating surfaces.

In testimony whereof I affix my signature.

EARL P. WEBSTER.